United States Patent
Hiremane

(10) Patent No.: US 9,582,332 B2
(45) Date of Patent: Feb. 28, 2017

(54) ENABLING A CLOUD TO EFFECTIVELY ASSIGN WORKLOADS TO SERVERS

(75) Inventor: Radhakrishna Hiremane, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 13/600,309

(22) Filed: Aug. 31, 2012

(65) Prior Publication Data

US 2014/0068078 A1    Mar. 6, 2014

(51) Int. Cl.
| | |
|---|---|
| *G06F 21/60* | (2013.01) |
| *G06F 9/50* | (2006.01) |
| *G06F 9/30* | (2006.01) |
| *H04N 21/2347* | (2011.01) |

(52) U.S. Cl.
CPC ......... *G06F 9/5044* (2013.01); *G06F 9/30178* (2013.01); *G06F 9/5055* (2013.01); *G06F 9/5072* (2013.01); *G06F 21/602* (2013.01); *H04N 21/2347* (2013.01); *G06F 2221/2107* (2013.01)

(58) Field of Classification Search
CPC .. G06F 9/30178; G06F 9/5044; G06F 9/5055; G06F 9/5072; G06F 21/602; G06F 2221/2107; H04N 21/2347
USPC ........ 709/226, 201, 203; 713/190, 152, 200; 717/160, 127; 726/1; 718/104; 379/265.09; 714/14
See application file for complete search history.

(56) References Cited

U.S. PATENT DOCUMENTS

| | | | |
|---|---|---|---|
| 6,113,650 A * | 9/2000 | Sakai | 717/160 |
| 7,430,670 B1 * | 9/2008 | Horning et al. | 713/190 |
| 8,447,863 B1 * | 5/2013 | Francis et al. | 709/226 |
| 2004/0003278 A1 * | 1/2004 | Chen et al. | 713/200 |
| 2008/0141069 A1 * | 6/2008 | Iwamura | 714/14 |
| 2010/0042976 A1 * | 2/2010 | Hines | 717/127 |
| 2010/0106812 A1 | 4/2010 | Bernabeu-Auban | |
| 2011/0153824 A1 | 6/2011 | Chikando | |
| 2011/0231899 A1 | 9/2011 | Pulier | |
| 2013/0051548 A1 * | 2/2013 | Chavez | 379/265.09 |
| 2013/0081043 A1 * | 3/2013 | Glew et al. | 718/104 |
| 2013/0111035 A1 * | 5/2013 | Alapati et al. | 709/226 |
| 2014/0059341 A1 * | 2/2014 | Edwards | 713/152 |
| 2014/0130117 A1 * | 5/2014 | Jeannot | 726/1 |

FOREIGN PATENT DOCUMENTS

JP    2001005791    1/2001

OTHER PUBLICATIONS

PCT International Search Report and Written Opinion issued in corresponding PCT/US2013/054242 dated Nov. 29, 2013, (10 pages).
English translation of Chinese Office Action for Patent Application No. 201380004559.5, dated Sep. 23, 2016, 13 pages.

* cited by examiner

*Primary Examiner* — Le Luu
(74) *Attorney, Agent, or Firm* — Barnes & Thornburg LLP

(57) ABSTRACT

In accordance with some embodiments, a public infrastructure as a service (IaaS) user can provide a file, to a cloud service provider, with information about the specific instructions and opcodes that may be used in an application run on the cloud service provider's system. This information may be developed at compile time by the user before the user deploys the workload onto the public IaaS cloud. Thus the user has complete control over the information that is provided.

15 Claims, 2 Drawing Sheets

ENABLING A CLOUD TO EFFECTIVELY ASSIGN WORKLOADS TO SERVERS

BACKGROUND

This relates generally to cloud computing.

In cloud computing, computing and storage capacity is provided to a variety of users based on economy of scale and sharing of resources. This enables users to have effectively limitless capacity without incurring the cost of setting up a data center.

Infrastructure as a Service or IaaS offers computers, either in physical form or as virtual machines, raw storage, firewalls, load balancers and networks to a variety of users. In public IaaS, the resources are available to any user. Generally, an IaaS cloud provider has a large pool of servers to service users on demand. The cloud user installs its own operating system images and application software and is responsible for their maintenance. The cloud user pays on a per use basis for the service actually used.

In public IaaS systems, the service provider who provides the cloud for use by all corners, is burdened with the problem that it does not know anything about the nature of the workloads it receives from these users. Generally the reason for this is that privacy and security concerns limit the information that the cloud service provider is provided. The cloud service provider cannot look at the customer's instance on the cloud service provider's servers to understand the application characteristics. Nor can that service provider monitor the physical resource consumption of the customer's applications extensively enough to determine the characteristics of the customer's applications as that would impact the customer application performance.

BRIEF DESCRIPTION OF THE DRAWINGS

Some embodiments are described with respect to the following figures.

DETAILED DESCRIPTION

Figure 1:
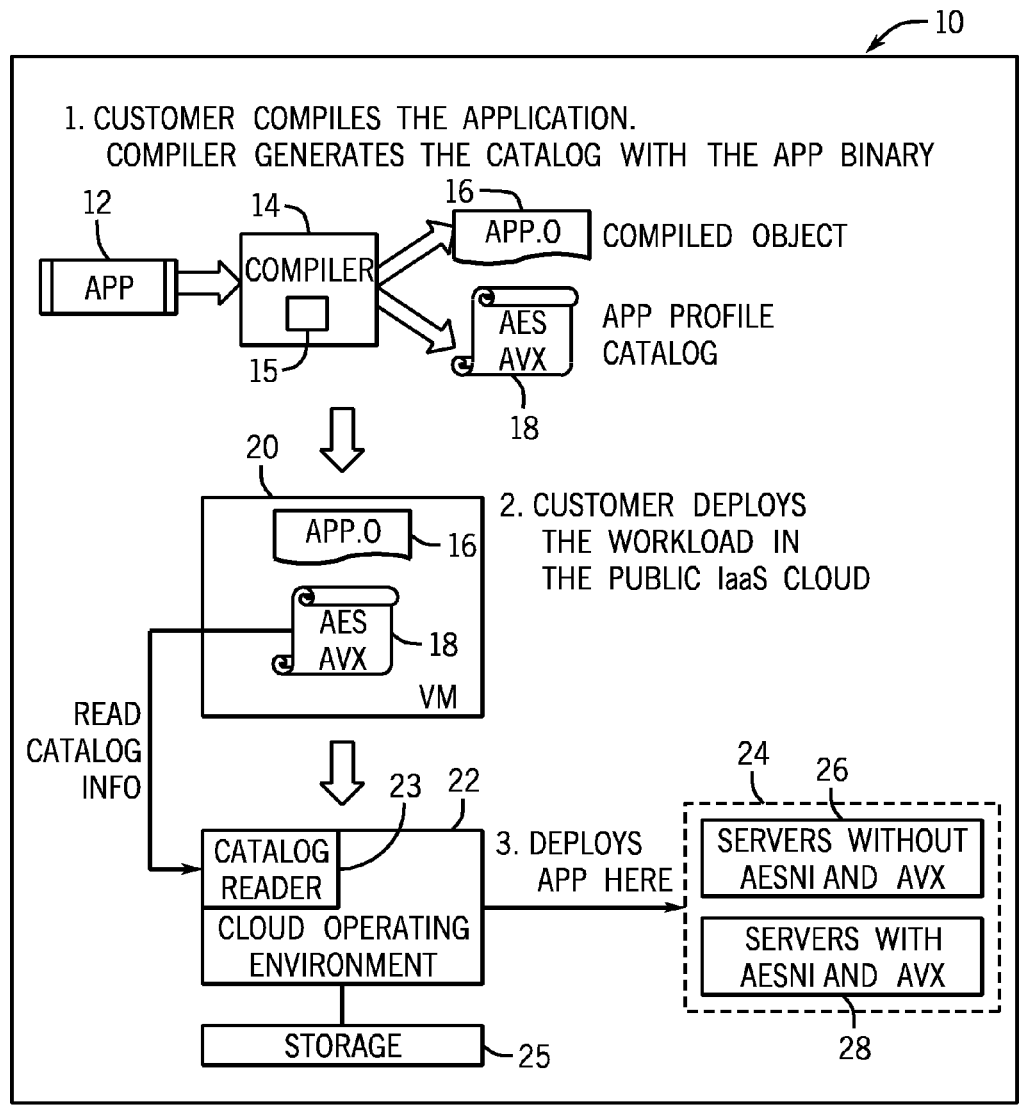
FIG. 1 is a schematic depiction for one embodiment to the present invention.

In accordance with some embodiments, a public Infrastructure as a Service (IaaS) user can provide a file, to a cloud service provider, with information about the specific instructions and opcodes that are used in an application to be run on the cloud service provider's system. This information may be developed at compile time by the user before the user deploys the workload onto the public IaaS cloud. Thus the user has complete control over the information that is provided in some embodiments.

For example, specific instructions and/or opcodes may be known to benefit from special handling on the cloud. Specific types of instructions may benefit from execution on servers with specific capabilities. If the cloud service provider knew that these instructions were present in an application, the cloud service provider could allocate the workload to the most efficient servers for that particular workload.

In particular, a cloud service provider may increase the consolidation ratios and enhance the efficiency of its infrastructure by packing as many instances as possible in a manner to maximize the individual server utilization. In addition a cloud service provider may avoid conflicting workloads from being placed on the same server. For example, instead of putting two memory bandwidth intensive workloads together on the same server, the workloads may be scheduled on different servers for better management of resources.

In some embodiments, at compile or deployment time of the application or the virtual machine instance, key application characteristics are captured in a file that may be called catalog. This catalog can be provided by the cloud user to the IaaS cloud service provider when the instance is deployed. Then the cloud service provider has knowledge, about the application characteristics, that can be used for efficiently scheduling and better mapping workloads to available server resources without needing to monitor or scrutinize the customer's application.

The catalog need not necessarily contain a runtime profile. For example when encryption is used in an application to be run on the cloud, such as Hypertext Transfer Protocol Secure (HTTPS) or Secure Sockets Layer (SSL), the compiler logs in the application catalog that the application would benefit from Advanced Encryption Standard (AES)-New Instruction (NI). Then the cloud service provider in turn utilizes this knowledge to schedule the workload on an AES-NI enabled server (rather than on an older system without encryption acceleration).

As another example when expensive floating point is used in the application to be run on the cloud, the catalog information may be used by the cloud service provider to deploy the workload onto servers that have many integrated core (MIC) assists.

And, as still another example, if the cloud service provider becomes aware that an application is combined with Advanced Vector Extensions (AVX) instruction set extension, as a result of analyzing the catalog, that service provider can match the workload to an available server and increase infrastructure and efficiency.

In some embodiments, the catalog may contain language specific hints such as that the workload in the virtual machine instance is Java-based and thereby the cloud service provider can schedule the workload on a Java Virtual Machine (JVM) optimized pool of servers.

Referring to FIG. 1, an overview of the system or data center 10 is shown. At the top, the compilation of the application at the cloud user's own site is shown at 1. The application (app) 12 is provided to a compiler 14 which generates the compiled object 16 as well as the catalog 18. As indicated in FIG. 1 the catalog 18 may identify that opcodes or instructions, such AES or AVX instructions, are present in the application that would benefit from being assigned to run on servers with special capabilities.

Then the customer deploys (#2) the workload into the public IaaS cloud on virtual machine (VM) 20. This means that the cloud receives both the compiled object 16 and the catalog 18. The cloud operating environment 22 with storage 25 includes a catalog reader 23 that reads the catalog information in the virtual machine as indicated by the arrow to the card reader 23. Then the cloud deploys the application to the IaaS hardware best suited to handle the workload to the extent feasible. This deployment may be limited by the availability of servers. In some cases a workload may be delayed until an appropriate server is available. For example if AES instructions are provided, the workload may be provided (#3) to servers with AES-NI and/or AVX capability as indicated at 28 rather than to servers 26 within structure 24 that do not include these capabilities.

In some embodiments, the compiler develops the catalog at compile time. Then when the cloud customer packages the application in the instance bought from the cloud service provider, the catalog is included with that instance. The catalog reader and the operating environment 22 may be embedded within the cloud operating environment. When a customer deploys the instance, the instance is batched into the cloud operating environment for scheduling on the available IaaS infrastructure 24. The cloud operating environment utilizing the embedded catalog reader understands the characteristics of the application and therefore deploys the workload based on the best infrastructure match.

Applications with certain capabilities such as AVX or AES-NI capabilities use very specific instructions and opcodes. So a parsing tool, as part of the compiler, locates those instructions and can flag that workload as it is being compiled. For example, the presence of instructions, such as AESENC, AESENCLAST, AESDEC, AESDECLAST, AESKEYGENASSIST, AESIMC, PCLMULQDQ, or their opcodes suggests the application could be compiled to take advantage of AES-NI instructions. The invention is not limited to these opcodes and instructions. Any instruction set instruction that can be identified by its opcode or functionality can be utilized by a compiler to achieve similar objectives.

Figure 2:
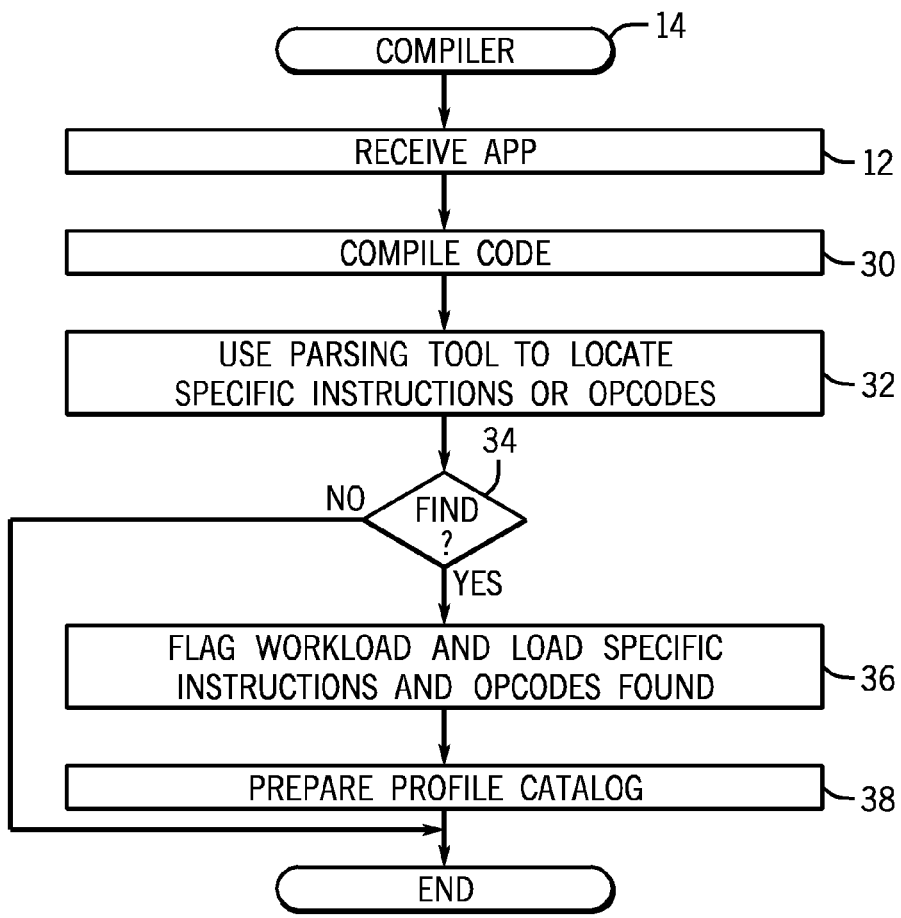
FIG. 2 is a flowchart for a sequence according to one embodiment to the present invention.

In FIG. 2 a compiler sequence 14 may be implemented in software, firmware and/or hardware. In software and firmware embodiments, computer executable instructions may be stored in one or more non-transitory computer readable media, such as magnetic, semiconductor and/or optical storage.

Thus referring to FIG. 2, the compiler 14 at the customer site receives the application as indicated in 12 and compiles the code as indicated at 30. A parsing tool within the compiler 14 may be used to locate specific instructions or opcodes as indicated in block 32. Basically a file may be provided with the instructions or opcodes to search for and the parsing tool automatically locates those instructions or opcodes within the code being compiled.

If the parsing tool finds any of these instructions, at diamond 34, it flags the workload and loads the specific instructions and opcodes found as indicated in block 36. Then a profile catalog may be prepared, as indicated in block 38, to be sent with the compiled object to the cloud service provider. In some embodiments a reader may be sent with the catalog.

The catalog may be in a particular form or template, provided by the cloud service provider in some embodiments. Also, particular codes may be established to indicate the presence of particular instructions or opcodes in the application. In addition, the catalog may include requests for handling on servers with particular characteristics. The catalog may also indicate how time sensitive the application is so that the cloud can assess whether to delay execution pending availability of a beneficial server. Similarly, the catalog may identify potentially conflicting workloads that should not be assigned to the same server.

Figure 3:
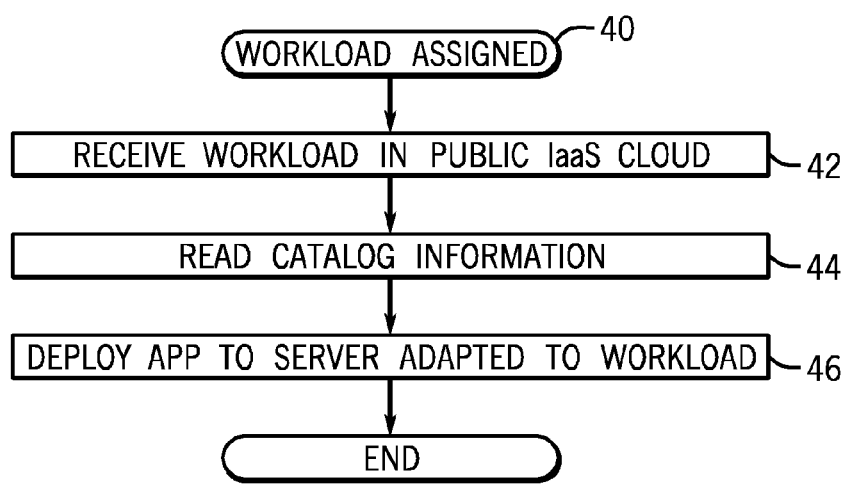
FIG. 3 is a flowchart for still another embodiment to the present invention.

In FIG. 3 a workload assigned sequence 40 may be implemented in software, firmware and/or hardware. In software and firmware embodiments, computer executable instructions may be stored in one or more non-transitory computer readable media, such as magnetic, semiconductor and/or optical storage.

The sequence 40, shown in FIG. 3, may be implemented in the cloud operating environment in one embodiment. At the cloud service provider, a workload assigner that is part of the cloud operating environment 22 receives the workload as indicated in block 42. The catalog reader within the operating environment reads the catalog information as indicated in block 44. Then the application is deployed to the appropriate server or server pool adapted the workload as indicated in block 46.

In some embodiments, the cloud operating environment 22 is a server or processor based system that executes instructions stored on computer readable media. Specifically, those instructions may be stored in one or more non-transitory computer readable media such as an optical, magnetic or semiconductor storage. For example in FIG. 1, such a storage is indicated at 25. That storage may store the instructions needed to implement the sequence shown in FIG. 3.

Likewise, the compiler 14 may include a storage 15 which stores instructions to implement the sequence shown in FIG. 2. In some embodiments, more than one storage may be used to store the set of instructions to implement the sequences of FIGS. 2 and 3.

In one embodiment, the catalog may be included in one or more packets including a header that identifies the packet or packets as a catalog. Then the packet or packets may be easily located by the parsing tool at compile time. Other techniques for facilitating the location of the catalog among other data may also be used.

The sequences described herein begin when the application is not yet loaded on the system such as the cloud that it is supposed to run on. The customer or the cloud provider has placed a workload on the cloud provider's queue. Then the cloud provider can pick it up and run it on one of the many servers inside the cloud provider's data center.

Before placing the workload on a system within the cloud provider's data center, the cloud provider can benefit by knowing if the workload is optimized for special instructions. Then the cloud provider can operate its data center resources more efficiently and customers may get better time to completion in some embodiments.

For example, a customer may place AVX optimized media workloads on a cloud. For privacy reasons, the cloud service provider may not examine the workload to see that it is AVX optimized or not. The customer has no means to tell the cloud service provider that the workload is AVX optimized or not.

In some embodiments of the present invention cloud providers and customers can communicate the workload profile in a scalable and automated manner. In this example, if the cloud service provider had AVX enabled servers within its server pool to run the workload, it could deploy the workload on such servers and get better time to completion and handle more workloads over time in some embodiments. Once the workload was placed on an AVX enabled server, the dynamic linked libraries (DLLs) can examine the central processor unit identifier (CPUID) and run the optimized code path. Namely, realizing that the server has AVX capabilities based on its central processing unit identifier, the application can run the optimized code.

The following clauses and/or examples pertain to further embodiments:

One example embodiment may be a method comprising obtaining information about instructions or opcodes used by an application; and assigning the application to a server of a plurality of servers in a cloud based on that information. The method may also include obtaining information includes obtaining information from a catalog accompanying compiled code for the application. The method may also include said information indicates that the application uses encryption, assigning the application to execute on a server adapted to run encryption instructions. The method may also include determining whether the application uses advanced vector instructions. The method may also include assigning the application to a server adapted to run advanced vector instructions. The method may also include receiving a compiled object together with said information at a cloud for execution. The method may also include reading said information in a cloud operating environment before assigning a workload including the object to a server. The method may also include selecting a server to handle said workload based on said information. The method may also include assigning a server in a public Infrastructure as a Service cloud.

Another example embodiment may be a non-transitory computer readable media storing instructions that enable a processor to: obtain information about instructions or opcodes used by an application; and assign the application to a server of a plurality of servers in a cloud based on that information. The media may further store instructions to obtain information from a catalog accompanying compiled code for said application. The media may further store instructions to assign the application to execute on a server adapted to run encryption instructions if said information indicates that the application uses encryption. The media may further store instructions to determine whether the application uses advanced vector instructions. The media may further store instructions to assign the application to a server adapted to run advanced vector instructions based on determining that the application uses advanced vector instructions. The media may further store instructions to receive a compiled object together with said information at a cloud for execution. The media may further store instructions to read said information in cloud operating environment before assigning a workload including the object to a server. The media may further store instructions to select a server to handle a workload based on said information. The media may further store instructions to assign a server in a public Infrastructure as a Service cloud.

One example embodiment may be a non-transitory computer readable media storing instructions to enable a processor to: receive an application; compile code for the application; locate specific instructions or opcodes within said code, and if a specific instruction is found, flag the application; and prepare a profile catalog identifying information about said instructions or opcodes for the application to be read at a cloud service provider's site. The media may include storing instructions to parse the application for encryption instructions. The media may include storing instructions to parse the application to determine whether the application uses advanced vector instructions. The media may include storing instructions to identify said instructions or opcodes at compile time. The media may also include storing instructions to send a compiled object together with said information to a cloud for execution.

Another example embodiment may be an apparatus comprising a processor to parse instructions or opcodes within an application and if a specific instruction or opcode is found, flag the application and prepare a profile catalog, to identify information about said instruction or opcode for the application, to be read at a cloud service provider's site; and a storage coupled to said processor. The apparatus may include said processor to parse the application for encryption instructions. The apparatus may include said processor to parse the application to determine whether the application uses advanced vector instructions. The apparatus may include said processor to identify said instructions or opcodes at compile time. The apparatus may also include said processor to send a compiled object together with said information to a cloud for execution.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an application at a server of a plurality of servers, including a first server that is adapted to perform encryption or decryption and a second server that is not adapted to perform encryption or decryption;
   receiving, by the server, a profile catalog that includes an indication of at least one hardware-accelerated instruction set architecture that is to be present in a server that is to execute the application;
   reading, at said catalog, a second indication that the application includes instructions or opcodes that require encryption or decryption;
   reading, by the server, a third indication that is indicative of a time sensitivity of the application; and
   assigning, by the server, said application to at least one of the plurality of servers as a function of the indication of the hardware-accelerated instruction set architecture included in the profile catalog and the indication of the time sensitivity of the application.

2. The method of claim 1 including if said application uses encryption, assigning the application to execute on a server adapted to run encryption instructions.

3. The method of claim 1 including determining whether the application uses advanced vector instructions.

4. The method of claim 3 including assigning the application to a server adapted to run advanced vector instructions.

5. The method of claim 1 including receiving a compiled object together with said profile catalog at a cloud for execution.

6. The method of claim 5 including reading said profile catalog in a cloud operating environment before assigning a workload including the object to a server.

7. The method of claim 6 including selecting a server to handle said workload based on said profile catalog.

8. The method of claim 1 including assigning a server in a public Infrastructure as a Service cloud.

9. One or more non-transitory computer readable media storing instructions that enable a processor to:
   receive an application at a server of a plurality of servers, including a first server that is adapted to perform encryption or decryption and a second server that is not adapted to perform encryption or decryption;
   receive a profile catalog that includes an indication of at least one hardware-accelerated instruction set architecture that is to be present in a server that is to execute the application;

read, at said catalog, a second indication that the application includes instructions or opcodes that require encryption or decryption;

read a third indication that is indicative of a time sensitivity of the application; and assign said application to at least one of the plurality of servers as a function of the indication of the hardware-accelerated instruction set architecture included in the profile catalog and the indication of the time sensitivity of the application.

10. The media of claim 9 further storing instructions to parse the profile catalog for encryption instructions.

11. The media of claim 9 further storing instructions to parse the profile catalog to determine whether the application uses advanced vector instructions.

12. A system comprising:

a plurality of servers including:

a first server to perform encryption or decryption;

a second server not adapted to perform encryption or decryption;

a processor to:

receive a profile catalog, to identify information about instructions or opcodes for an application, read, at said catalog, an indication of at least one hardware-accelerated instruction set architecture that is to be present in a server that is to execute the application, read, at said catalog, a second indication that the application includes instructions or opcodes that require encryption or decryption, read a third indication that is indicative of a time sensitivity of the application, and assign said application to at least one of the plurality of servers as a function of the indication of the hardware-accelerated instruction set architecture included in the profile catalog and the indication of the time sensitivity of the application; and a storage coupled to said processor.

13. The system of claim 12, wherein said processor is to parse the profile catalog to determine whether the application uses advanced vector instructions.

14. The system of claim 12, wherein said processor is to execute a catalog reader included in a package with the profile catalog to read the profile catalog.

15. The system of claim 12, wherein said processor is to read an indication of an incompatible workload from the profile catalog and wherein to assign the application comprises to select a server from the plurality of servers that has not been assigned to execute the incompatible workload.

* * * * *